US008411750B2

(12) United States Patent  
Dane

(10) Patent No.: US 8,411,750 B2
(45) Date of Patent: Apr. 2, 2013

(54) GLOBAL MOTION PARAMETER ESTIMATION USING BLOCK-BASED MOTION VECTORS

(75) Inventor: Gokce Dane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 12/609,636

(22) Filed: Oct. 30, 2009

(65) Prior Publication Data

US 2011/0103480 A1  May 5, 2011

(51) Int. Cl.
*H04N 7/12* (2006.01)
*H04N 11/02* (2006.01)
*H04N 11/04* (2006.01)

(52) U.S. Cl. .............. 375/240.16; 375/240.01

(58) Field of Classification Search .............. None
See application file for complete search history.

(56) References Cited

U.S. PATENT DOCUMENTS

| | | | |
|---|---|---|---|
| 5,781,249 A | 7/1998 | Hwang | |
| 5,978,048 A | 11/1999 | Lee | |
| 6,809,758 B1 | 10/2004 | Jones | |
| 2003/0067560 A1* | 4/2003 | Suzuki | 348/578 |
| 2004/0028134 A1* | 2/2004 | Subramaniyan et al. | 375/240.16 |
| 2004/0208246 A1 | 10/2004 | Conklin | |
| 2006/0291561 A1 | 12/2006 | Seong et al. | |
| 2007/0076982 A1 | 4/2007 | Petrescu | |
| 2007/0147506 A1* | 6/2007 | Kwon et al. | 375/240.16 |
| 2008/0004073 A1* | 1/2008 | John et al. | 455/556.1 |
| 2008/0159400 A1 | 7/2008 | Lee et al. | |
| 2009/0167958 A1 | 7/2009 | Wredenhagen | |
| 2010/0202660 A1* | 8/2010 | Lin et al. | 382/103 |

FOREIGN PATENT DOCUMENTS

EP  1117251 A1  7/2001

OTHER PUBLICATIONS

Dufaux et al., "Efficient, robust, and fast global motion estimation for video coding," IEEE Transactions in Image Processing, Mar. 2000, pp. 497-501.
International Search Report and Written Opinion—PCT/US2010/054319—ISA/EPO—Jan. 3, 2012.
Su et al., "Global motion estimation from coarsely sampled motion vector field and the applications," IEEE Transactions on Circuits and Systems for Video Technology, Feb. 2005, pp. 232-242.

* cited by examiner

*Primary Examiner* — Joseph Ustaris
*Assistant Examiner* — Kevin McInnish
(74) *Attorney, Agent, or Firm* — Steven Thiel; Brent A. Boyd

(57) ABSTRACT

Techniques for estimating global motion parameters based on block-based motion vectors are described. Horizontal and vertical motion parameters are estimated independently. A video processing device, in one example, generates horizontal motion parameter candidates for each row and vertical motion parameter candidates for each column, and selects the median of the horizontal motion parameter candidates as the global horizontal motion parameter and the median of the vertical motion parameter candidates as the global vertical motion parameter. The video processing device may further eliminate candidates by calculating error values for each candidate and remove those candidates with error values below an error threshold. The video processing device may also use pre-calculated values of matrices when calculating each of the candidates to further improve efficient calculation of the global motion parameters.

32 Claims, 6 Drawing Sheets

GLOBAL MOTION PARAMETER ESTIMATION USING BLOCK-BASED MOTION VECTORS

TECHNICAL FIELD

This disclosure relates to video coding and, more particularly, motion estimation for video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames or slices.

Global motion generally refers to motion of a frame. Various techniques have been utilized for estimating global motion of a frame. One method includes developing a model of global motion and minimizing prediction error by a gradient descent method applied over input images. The images can be full resolution or can be a pyramid of images with different resolutions. Sometimes block-based translational motion vectors are found first and used as initial candidates in order to speed up the global motion parameter estimation process. This method relies on pixel information to obtain final global motion parameters.

SUMMARY

In general, this disclosure describes techniques for estimating global motion parameters for a video frame using block-based motion vectors. Global motion generally describes the motion of a whole scene of a video frame, such as motion caused by camera panning, tilting, zoom in, zoom out, or rotation. Global motion can also be used to describe the motion of objects within a video frame. Global motion estimation refers to estimation of motion parameters that fit a global parametric model. Global motion estimation is typically a very high complexity process, for which model parameters are found using iterative methods, for example, by using a gradient descent method in the pixel domain.

This disclosure describes a low-complexity algorithm for estimation of global motion parameters. The techniques of this disclosure use translational block-based motion vectors in which each translational motion vector has two components, including vertical and horizontal components. As opposed to other global motion estimation techniques, the techniques of this disclosure rely on available block-based translational motion vectors (i.e., in the motion vector domain), without requiring access to pixel values. Information obtained from pixel values can also be used together with the proposed technique.

In one example, a method includes determining, with a video processing device, for a plurality of coded units arranged in a plurality of vectors from a portion of a video frame, a set of horizontal parameter candidates for a horizontal parameter of a global motion model for the portion of the video frame, wherein each of the horizontal parameter candidates corresponds to one of a first subset of the plurality of vectors, selecting, with the video processing device, a median value from the set of horizontal parameter candidates as the horizontal parameter of the global motion model for the portion of the video frame, determining, with the video processing device, a set of vertical parameter candidates for a vertical parameter of the global motion model for the portion of the video frame, wherein each of the vertical parameter candidates corresponds to a second subset of the plurality of vectors, selecting, with the video processing device, a median value from the set of vertical parameter candidates as the vertical parameter of the global motion model for the portion of the video frame, and processing, with the video processing device, at least one of the plurality of coded units according to the horizontal motion parameter and the vertical motion parameter.

In another example, an apparatus includes a video processing device configured to determine, for a plurality of coded units of a portion of a video frame, wherein the coded units are arranged in a plurality of vectors, a set of horizontal parameter candidates for a horizontal parameter of a global motion model for the portion of the video frame, wherein each of the horizontal parameter candidates corresponds to one of a first subset of the plurality of vectors, select a median value from the set of horizontal parameter candidates as the horizontal parameter of the global motion model for the portion of the video frame, determine a set of vertical parameter candidates for a vertical parameter of the global motion model for the portion of the video frame, wherein each of the vertical parameter candidates corresponds to one of the second subset of the plurality of vectors, select a median value from the set of vertical parameter candidates as the vertical parameter of the global motion model for the portion of the video frame, and process at least one of the plurality of coded units according to the horizontal motion parameter and the vertical motion parameter.

In another example, an apparatus includes means for determining, for a plurality of coded units of a portion of a video frame, wherein the coded units are arranged in a plurality of vectors, a set of horizontal parameter candidates for a horizontal parameter of a global motion model for the portion of the video frame, wherein each of the horizontal parameter candidates corresponds to one of a first subset of the plurality of vectors, means for selecting a median value from the set of horizontal parameter candidates as the horizontal parameter of the global motion model for the portion of the video frame, means for determining a set of vertical parameter candidates for a vertical parameter of the global motion model for the portion of the video frame, wherein each of the vertical parameter candidates corresponds to one of a second subset of the plurality of vectors, means for selecting a median value from the set of vertical parameter candidates as the vertical parameter of the global motion model for the portion of the video frame, and means for processing at least one of the plurality of coded units according to the horizontal motion parameter and the vertical motion parameter.

In another example, a computer-readable medium, such as a computer-readable storage medium, contains, e.g., is encoded with, instructions that cause a programmable processor to determine for a plurality of coded units of a portion of a video frame, wherein the coded units are arranged in a plurality of vectors, a set of horizontal parameter candidates for a horizontal parameter of a global motion model for the portion of the video frame, wherein each of the horizontal parameter candidates corresponds to one of a first subset of the plurality of vectors, select a median value from the set of horizontal parameter candidates as the horizontal parameter of the global motion model for the portion of the video frame, determine a set of vertical parameter candidates for a vertical parameter of the global motion model for the portion of the video frame, wherein each of the vertical parameter candidates corresponds to one of a second subset of the plurality of vectors, select a median value from the set of vertical parameter candidates as the vertical parameter of the global motion model for the portion of the video frame, and process at least one of the plurality of coded units according to the horizontal motion parameter and the vertical motion parameter.

The details of one or more examples are set forth in the accompanying drawings and the description below. Other features, objects, and advantages will be apparent from the description and drawings, and from the claims.

DETAILED DESCRIPTION

Figure 1:
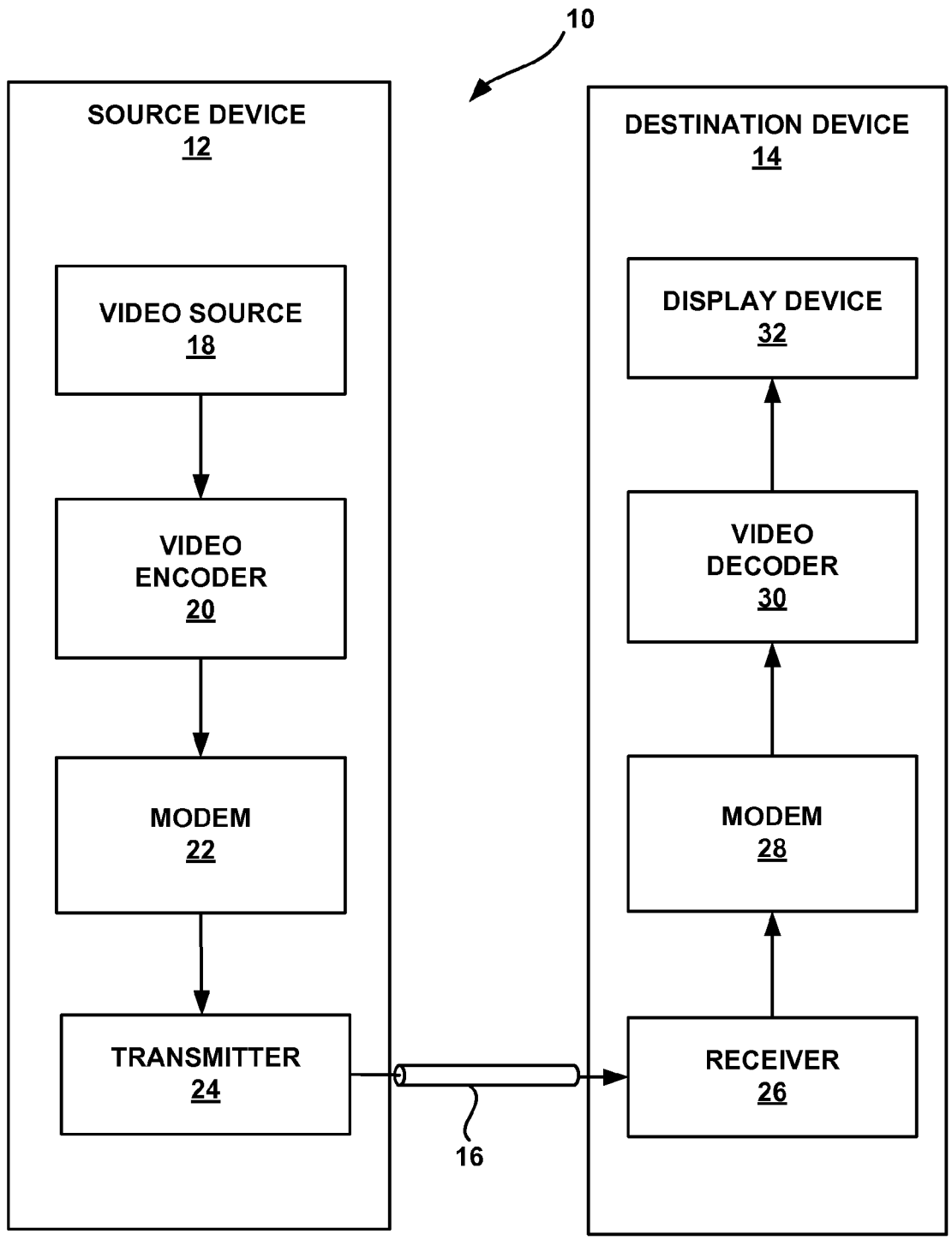
FIG. 1 is a block diagram illustrating an example video encoding and decoding system that may utilize techniques for estimating global motion parameters in accordance with the techniques of this disclosure.

The techniques of this disclosure, on the other hand, do not necessarily require access to pixel information in order to calculate global motion parameters. That is, in some examples, the techniques of this disclosure can be implemented in the motion vector domain, i.e., using motion vectors without pixel value data. The techniques of this disclosure may include obtaining parameters for a simplified affine model by fitting translational motion vectors into the model according to a least squares solution. Horizontal and vertical parameters for the model are estimated independently. The parameter motion model used in the context of one example of these techniques may comprise the following two equations:

$$MV\_x_i = b_2 * x_i + b_1 \quad (1)$$

$$MV\_y_j = c_2 * y_j + c_1 \quad (2)$$

A video frame generally comprises a plurality of rows of pixels and a plurality of columns of pixels, arranged as a two-dimensional matrix. This disclosure also refers to rows and/or columns of pixels as "vectors of pixels." Accordingly, a set of vectors of pixels may correspond to a plurality of rows or a plurality of columns. In the simplified affine model depicted in the two equations above, $MV\_x_i$ describes the horizontal component of the motion vector corresponding to a particular row i of a video frame, while $MV\_y_j$ describes the vertical component of the motion vector corresponding to column j of the video frame. The techniques of this disclosure include determining $MV\_x_i$ for each row i and $MV\_y_j$ for each column j, and then identifying the horizontal and vertical global motion parameters from these collected sets of row and column parameters, as described in greater detail below. Although generally described with respect to a four-parameter simplified affine model, it should be understood that the techniques of this disclosure may also apply to other types of motion models as well, such as a six-parameter parametric model, where parameters can be estimated independently or dependently.

The techniques of this disclosure use a block-based motion vector field, and, in some examples, pixel variance for each block, as inputs. After performing regularization on the input motion vectors, model parameters are found by fitting motion vectors to the pre-determined model in a per-row and per-column fashion. In other words, the techniques of this disclosure do not need to access all of the motion vectors at once, but rather may calculate model parameters for each row and for each column individually and later combine these parameters by using fitting confidence values. In addition to the power, memory, and low-complexity benefits, these techniques have the flexibility to describe the global motion of a specific area of a frame, in addition to global motion of an entire frame.

In general, the term macroblock refers to a data structure for encoding picture and/or video data according to a two-dimensional pixel array that comprises 16×16 pixels. The macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra- (I), or inter- (P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

FIG. 1 is a block diagram illustrating an example video encoding and decoding system 10 that may utilize techniques for estimating global motion parameters in accordance with the techniques of this disclosure. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which concern estimating global motion parameters, are not necessarily limited to wireless applications or settings. For example, these techniques may apply to over-the-air television broadcasts, cable television transmissions, satellite television transmissions, Internet video transmissions, encoded digital video that is encoded onto a storage medium, video recording and display in digital cameras, or other scenarios. Accordingly, communication channel 16 may comprise any combination of wireless or wired media suitable for transmission of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 and/or video decoder 30 of destination device 14 may be configured to apply one or more of the techniques for estimating global motion parameters. Video encoder 20 and video decoder 30 are both examples of video processing units that may perform the techniques of this disclosure for estimating global motion parameters. In other examples, a source device and a destination device may include other components or arrangements. For example, source device 12 may receive video data from an external video source 18, such as an external camera. Likewise, destination device 14 may interface with an external display device, rather than including an integrated display device. Furthermore, source device 12 and/or destination device 14 may comprise a video front end, a video back end, a video combined encoder decoder (CODEC), or any other video processing unit or video processing device for performing the techniques of this disclosure.

The illustrated system 10 of FIG. 1 is merely one example. Techniques for estimating global motion parameters as described in this disclosure may be performed by any digital video processing device, such as an encoding and/or decoding device. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, an/or a video feed, from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to estimate global motion parameters for encoding of video data. The video decoding process performed by video decoder 30 may also use such techniques during the decoding process. The information communicated over channel 16 may include syntax information defined by video encoder 20, which is also used by video decoder 30, that includes syntax elements that describe characteristics and/or processing of macroblocks and global motion parameters. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively described as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. Video encoder 20 operates on video blocks within individual video frames in order to encode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "x" and "by" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction and 16 pixels in a horizontal direction. Likewise, an N×N block generally has N pixels in a vertical direction and N pixels in a horizontal direction, where N represents a positive integer value. The pixels in a block may be arranged in rows and columns.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered to be video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Either or both of video encoder 20 and/or video decoder 30 may be configured to perform the techniques of this disclosure, as described in greater detail below. For example, video encoder 20 may be configured to calculate global motion parameters to be sent to video decoder 30, or to be used by video encoder 20. Video encoder 20 may use the global motion parameters to enhance or improve image quality, e.g., to reduce or remove shaking caused by hand jitter (referred to herein as "shakiness artifacts"). In some examples, video decoder 30 may be configured to receive the global motion parameters from video encoder 20, while in other examples, video decoder 30 may be configured to calculate global motion parameters from block-based motion vectors of received frames.

Video decoder 30 may use global motion parameters to perform frame interpolation, e.g., to produce interpolated frames for the purpose of frame rate up-conversion (FRUC). Video decoder 30 may also be configured to perform video enhancement, e.g., to remove shakiness artifacts. In this manner, either or both of video encoder 20 and/or video decoder 30 may be configured to calculate global motion parameters, and either or both of video encoder 20 and/or video decoder 30 may use the global motion parameters for a variety of purposes.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
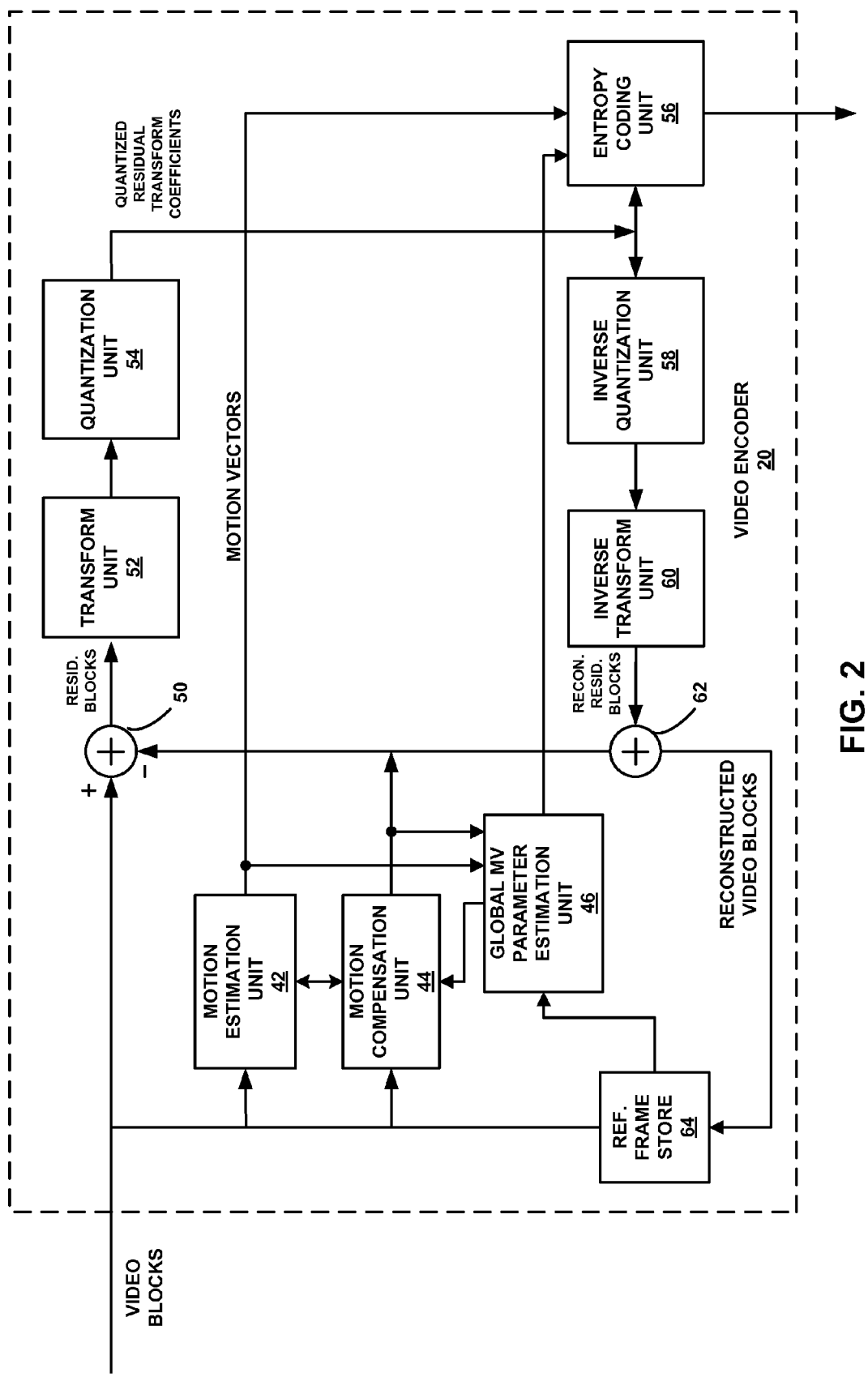
FIG. 2 is a block diagram illustrating an example of a video encoder that may implement techniques for estimating global motion parameters consistent with this disclosure.

FIG. 2 is a block diagram illustrating an example of video encoder 20 that may implement techniques for estimating global motion parameters consistent with this disclosure. Video encoder 20 is an example of a video processing device that may perform the techniques of this disclosure. It should be understood, however, that any video processing device, e.g., a video encoder, a video decoder, a video front end, a video back end, a video codec, or any other device for processing video may be configured to perform the techniques of this disclosure. Moreover, these techniques may be implemented in any combination of hardware, software, and/or firmware. In the case or software and/or firmware, the techniques are implemented on an underlying hardware device that executes instructions provided by the software and/or firmware. In the example of FIG. 2, video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Inter-coding can also be used to remove redundancy between video frames coming from different video sequences representing different views of the same scene, such as in the case of multi-view coding. Intra-mode (I-mode) may refer to any of several spatial based compression modes and inter-modes such as prediction (P-mode) or bi-directional (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes motion compensation unit 44, motion estimation unit 42, reference frame store 64, summer 50, transform unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. An intra prediction unit may also perform intra-predictive coding of the received video block relative to one or more neighboring blocks in the same frame or slice as the block to be coded to provide spatial compression.

Mode select unit 39 may select one of the coding modes, intra or inter, e.g., based on error results, and provide the resulting intra- or inter-coded block to summer 50 to generate residual block data and to summer 62 to reconstruct the encoded block for use as a reference frame.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame store 64. Motion compensation unit 44 may also interpolate sub-integer pixels of the reference frame, e.g., an I-frame or a P-frame. The ITU H.264 standard refers to reference frames as "lists." Therefore, data stored in reference frame store 64 may also be considered lists. Motion estimation unit 42 compares blocks of one or more reference frames (or lists) from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame. Motion estimation unit 42 sends the calculated motion vector to entropy coding unit 56 and motion compensation unit 44. The reference frame block identified by a motion vector may be referred to as a predictive block. Motion compensation unit 44 calculates error values for the predictive block of the reference frame.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform unit 52 applies a transform, such as a discrete cosine transform (DCT) or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to intercode a block in a subsequent video frame.

In the example of FIG. 2, video encoder 20 also includes global motion vector (MV) parameter estimation unit 46. In some examples, a video encoder, such as video encoder 20, does not include a global MV parameter estimation unit, e.g., when a corresponding video decoder includes a unit similar to global MV parameter estimation unit 46. That is, in some examples, the techniques for estimating global motion parameters may be performed by one of video encoder 20 or video decoder 30. In general, global MV parameter estimation unit 46 performs the techniques of this disclosure to determine global motion parameters for a particular frame from block-based motion vectors of the frame. Global MV parameter estimation unit 46 uses the block-based motion vectors determined by motion estimation unit 42 to determine global motion parameters that fit a global motion model, such as a simplified affine four-parameter model or a six- or more-parameter parametric model. Global MV parameter estimation unit 46 may also use block variance values for the blocks as calculated by motion compensation unit 44. In some examples, global MV parameter estimation unit 46 may calculate the block variance relative to a reference frame of reference frame store 64.

Global MV parameter estimation unit 46 may provide the global motion parameters to motion compensation unit 44, which may in turn provide the global motion parameters to motion estimation unit 42. Motion estimation unit 42 and motion compensation unit 44 may be configured to use the global motion parameters to reduce or eliminate unwanted motion, e.g., motion caused by camera shakiness when an operator does not hold the camera steady. Motion estimation unit 42 and motion compensation unit 44 may therefore be configured to perform an enhancement of video data by removing shakiness artifacts from the video data.

Global MV parameter estimation unit 46 may, additionally or alternatively, provide the global motion parameters to entropy coding unit 56. Video encoder 20 may thereby send the global motion parameters calculated by global MV parameter estimation unit 46 to a video decoder, such as video decoder 30. As discussed in greater detail below, video decoder 30 may use the global motion parameters provided by video encoder 20 to perform video enhancement, similar to the example described above for reducing camera shakiness artifacts, or to perform frame interpolation for FRUC. A particular motion estimation algorithm may influence the quality of motion vectors produced by execution of the motion estimation algorithm. For a frame rate up conversion application, it is important that the motion vectors represent the actual motion (i.e. real velocities) of objects between frames. These type of motion vectors are typically called "true motion vectors", as opposed to "codec motion vectors". "Codec motion vectors" may be obtained by minimizing displaced frame difference where the goal is to improve rate distortion efficiency in video compression. Various artifacts may appear in interpolated frames in FRUC if block-based motion vectors are used, due to the non-smooth and irregular nature of block based codec motion vectors. However, if a global motion model is used, then the block-based motion vectors derived according to the estimated global motion model may be more coherent, which may result in smoother interpolated frames in FRUC.

Although illustrated as a separate unit, the functionality of global MV parameter estimation unit 46 may be functionally integrated within either or both of motion estimation unit 42 and/or motion compensation unit 44. For example, a single hardware unit may perform each of the functions attributed to any or all of motion estimation unit 42, motion compensation unit 44, and/or global MV parameter estimation unit 46. As an example, instructions for each of motion estimation unit 42, motion compensation unit 44, and global MV parameter estimation unit 46 may be encoded on a computer-readable storage medium, which instructions may be executed by a processor. A separate hardware unit, such as a separate processor, DSP, FPGA, ASIC, or other hardware unit, may also be configured to perform the functions attributed to global MV parameter estimation unit 46.

Figure 3:
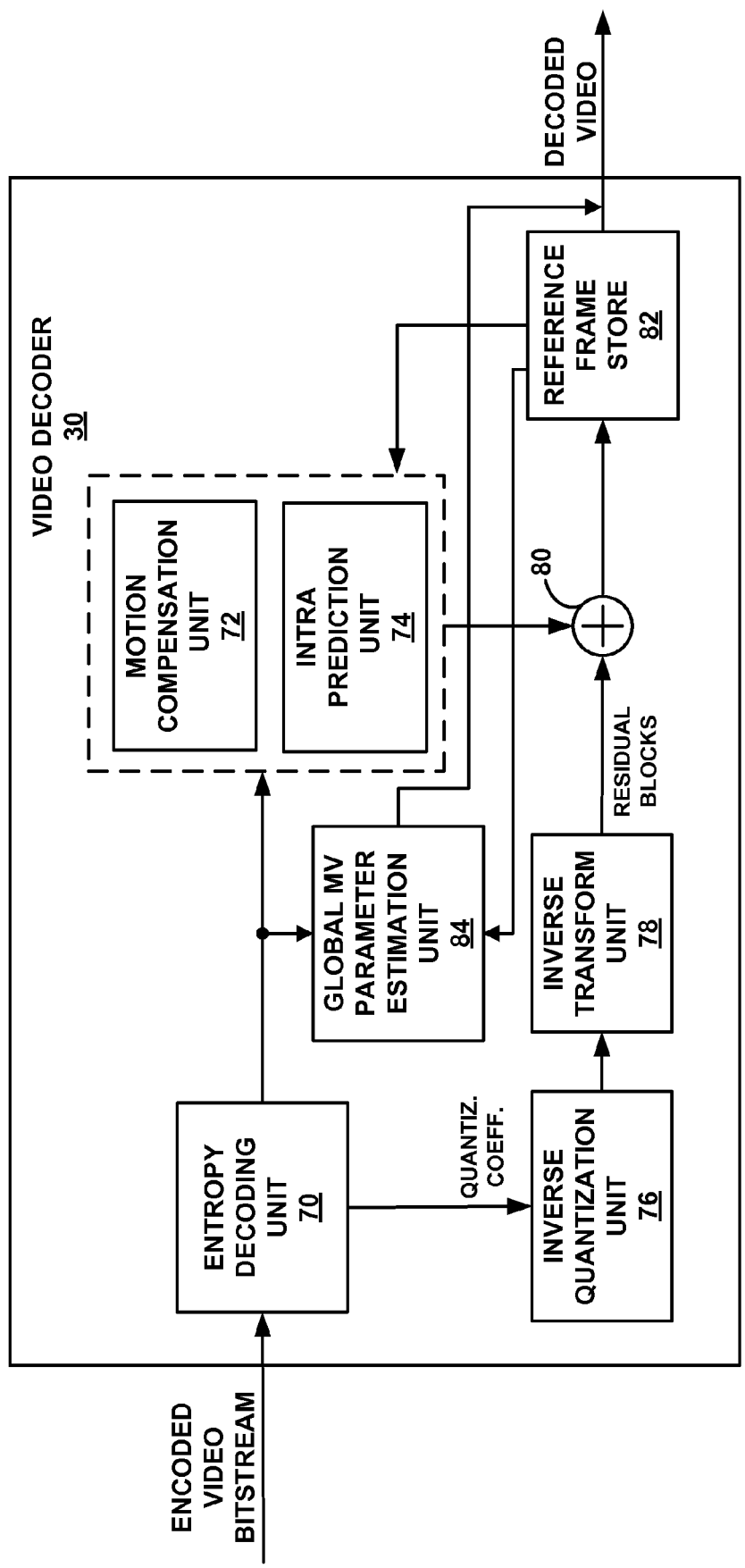
FIG. 3 is a block diagram illustrating an example of a video decoder, which decodes an encoded video sequence.

FIG. 3 is a block diagram illustrating an example of video decoder 30, which decodes an encoded video sequence. The encoded video sequence may include global motion parameters. Video decoder 30 includes global motion vector parameter estimation unit 84 that is configured to calculate global motion parameters according to the techniques of this disclosure, e.g., to perform frame rate up-conversion (FRUC). Video decoder 30 comprises an example video processing device for performing the techniques of this disclosure. In the example of FIG. 3, video decoder 30 also includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream to identify a prediction block in reference frames in reference frame store 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 50 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (or lists) for each inter-encoded macroblock or partition, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

In the example of FIG. 3, video decoder 30 also includes global MV parameter estimation unit 84. In some examples, video decoder 30 may not include a global MV parameter estimation unit, e.g., when a corresponding video encoder includes a unit similar to global MV parameter estimation unit 84. In general, global MV parameter estimation unit 84 performs the techniques of this disclosure to determine global motion parameters for a particular frame from block-based motion vectors of the frame. Global MV parameter estimation unit 84 uses received block-based motion vectors, decoded by entropy decoding unit 70, to determine global motion parameters that fit a global motion model, such as a simplified affine four-parameter model or a six or more-parameter parametric model. Global MV parameter estimation unit 84 may also calculate block variance by using pixel values from reference frame storer unit 82 to calculate global motion parameters. Alternatively or additionally, global MV parameter estimation unit 84 may use residual values for the blocks received from motion compensation unit 72 to calculate the global motion parameters as well.

In some examples, video decoder 30 may additionally include a FRUC unit for performing frame rate up-conversion. The FRUC unit of video decoder 30 may comprise global MV parameter estimation unit 84. To perform FRUC, the FRUC unit may use the global parameters determined by global MV parameter estimation unit 84, e.g., to establish presumptions of block-based motion vectors of each block for an interpolated FRUC frame. The FRUC unit may be additionally configured to modify each block of the FRUC frame by individual block-based motion vectors.

Figure 4:
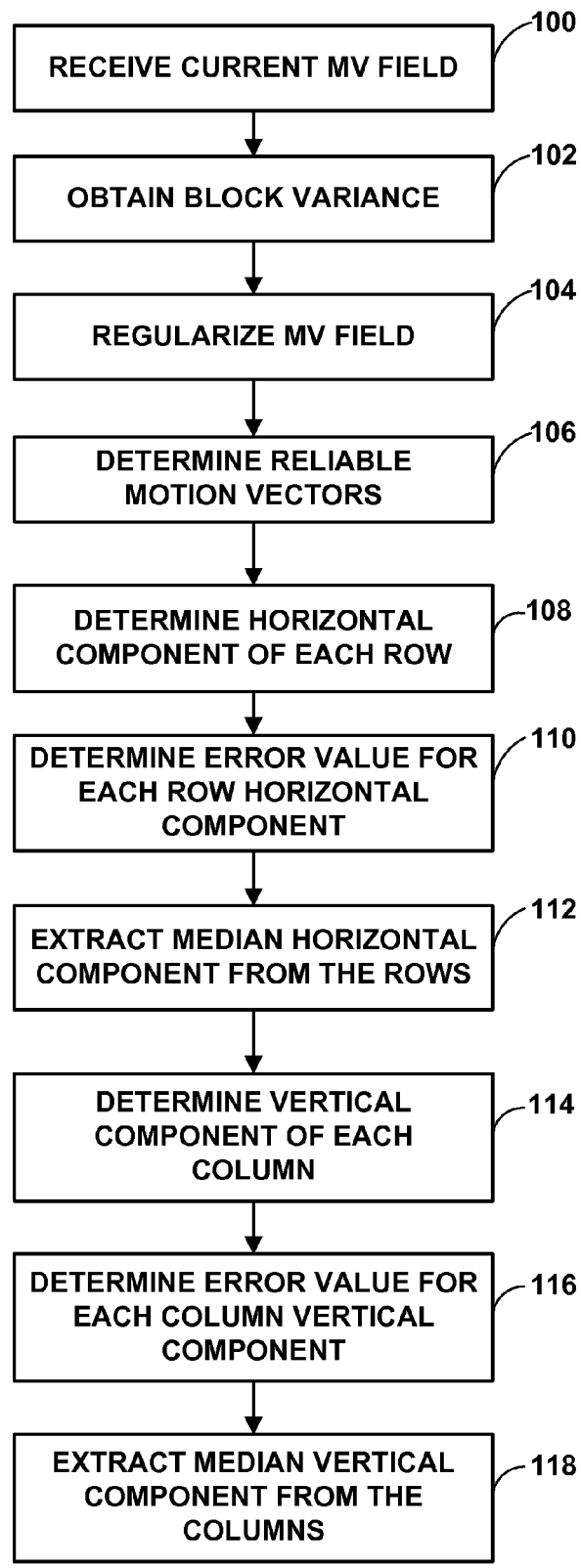
FIG. 4 is a flowchart illustrating an example method for calculating global motion parameters.

FIG. 4 is a flowchart illustrating an example method for calculating global motion parameters. Global MV parameter estimation unit 46 of video encoder 20 and/or global MV parameter estimation unit 84 of video decoder 30 may be configured to perform the method of FIG. 4. Likewise, other components of a video encoder, a video decoder, or a video encoder/decoder (a video codec) or a video coder may be configured to perform the method of FIG. 4. For purposes of illustration, the method of FIG. 4 will be described with respect to global MV parameter estimation unit 84.

Initially, global MV parameter estimation unit 84 calculates or receives block variance for a frame (or other coded unit) for which global motion parameters are being calculated (100). The motion vector field comprises translational motion vectors for each of the macroblocks or other sub-units forming the frame. That is, each of the motion vectors of each of the macroblocks forms the motion vector field. Block variance refers to a variance of pixel values of a reference block. A current block can also be used in calculating the variance, since the goal is to eliminate the wrongly calculated block-based motion vectors assigned to moving flat blocks In one example, the motion vector field comprises each of the motion vectors for each of the macroblocks comprised by the frame for which the global motion parameters are being calculated. The motion vectors can be estimated by any type of Motion Estimation (ME) algorithm, e.g., the ME algorithm performed by motion estimation unit 42 (FIG. 2).

When the method of FIG. 4 is performed by video encoder 20, global MV parameter estimation unit 46 may receive the MV field directly from motion estimation unit 42, as shown in FIG. 2. The motion vectors may alternatively be received from the bit-stream, e.g., when the method of FIG. 4 is performed by video decoder 30. Per the example of FIG. 3, global MV parameter estimation unit 84 receives each of the block-based motion vectors of the motion vector field as output of entropy decoding unit 70. The block size can be any number, such as 4×4, 8×8, 16×16, or even bigger, for example, 240×360 (such as the case of a global motion estimation algorithm implemented by a video front end (VFE) for an image registration application, where few motion vectors are estimated per frame). A video front end may comprise a distinct hardware unit or software module that processes raw video frames before the video frames are encoded.

In the example of FIG. 3, global MV parameter estimation unit 84 also obtains, e.g., receives or calculates, block variance (102) by using unit 82. In general, receipt or calculation of the block variance is optional. When the ME algorithm is calculated at the target location (such as at the decoder or at the encoder where a global motion vector is needed), the block variance is calculated during ME operation, e.g., by motion compensation unit 44. If the motion estimation algorithm is not calculated in the target location (e.g., when the method of FIG. 4 is performed by video decoder 30), the block variance input can be skipped, or other methods which use compressed-domain information to calculate variance can be used. For example, global MV parameter estimation unit 84 may calculate block variance by using pixel information in unit 78, as shown in FIG. 3.

After receiving the motion vector field (and, in some examples, after receiving the block variances), global MV parameter estimation unit 84 regularizes the motion vector field (104). In general, to regularize the motion vector field, global MV parameter estimation unit 84 may apply outlier correction and may smooth the motion vectors. For outlier correction, global MV parameter estimation unit 84 uses median filtering of motion vectors by using a motion vector window, whose size can be 3×3, 5×5, or a different size depending on the frame size and the block size. The median operation within a motion vector window can be applied to horizontal and vertical components of motion vectors separately. Alternatively, a vector median operation can also be applied to motion vectors in the motion vector window. The output motion vector from median operation may replace the motion vector. The output motion vector can also selectively replace the motion vector if the difference of median motion vector and original motion vector of the block of interest is above a threshold. The median operation may automatically correct the outliers and results in smoother motion vector field. Median filtering can be applied once or multiple times on the frame. In this manner, global MV parameter estimation unit 84 produces a set of regularized motion vectors from the received motion vector field.

Global MV parameter estimation unit 84 then determines which of the regularized motion vectors are reliable motion vectors (106). Global MV parameter estimation unit 84 distinguishes reliable motion vectors by using the variance of each block, when the variances are received or calculated, as described in greater detail below. In examples in which the variance for each block is not received or calculated, global MV parameter estimation unit 84 may treat each motion vector of the row as a potential candidate for the motion vector parameter without differentiating between reliable and unreliable motion vectors, thus effectively skipping step 106. However, in the example method of FIG. 4, in which global MV parameter estimation unit 84 distinguishes reliable motion vectors, global MV parameter estimation unit 84 may determine that a motion vector of a block is reliable when the pixel variance of the block is greater than a threshold value, whose value can be adjusted based on, for example, block size. When global MV parameter estimation unit 84 determines that a motion vector is unreliable (when the variance for the block corresponding to the motion vector is less than the threshold value), global MV parameter estimation unit 84 excludes the motion vector from consideration as a candidate for the global motion parameter.

Not every motion vector is necessarily dependable enough to be used in the fitting method described below. For example, motion vectors of flat, un-textured areas are typically assigned (0, 0) motion vectors, even though the flat area might be moving globally. This is because typical motion estimation algorithms minimizes a cost function such as sum of absolute difference (SAD) or mean squared error (MSE) to find translational motion parameters for best rate-distortion efficiency, but this does not necessarily result in the true motion vector estimation for a particular block. A motion vector of (0, 0) of a flat, non-textured block area will result in a block variance of 0, which is less than the example threshold value of 50.

In the example of FIG. 4, in which unreliable motion vectors are excluded from consideration, global MV parameter estimation unit 84 then uses the reliable block-based motion vectors to determine global motion parameters (108-112). In examples for which global MV parameter estimation unit 84 does not differentiate reliable motion vectors, global MV parameter estimation unit 84 uses all of the block-based motion vectors to determine the global motion parameters. However since outlier motion vectors are corrected via median filtering even before global motion parameter estimation, there are less unreliable motion vectors at this stage. In general, the process includes estimating motion parameters for the horizontal direction ($\{b_1, b_2\}$ per the components of equation (1) above) independently from the motion parameters for the vertical direction ($\{c_1, c_2\}$ per the components of equation (2) above). For six-or-more parameter global motion models, horizontal and vertical components can be calculated dependently as well. In general, global MV parameter estimation unit 84 may perform the method of FIG. 4 for each of a set of vectors of coded units (e.g., blocks) to determine horizontal and global motion parameters. For example, global MV parameter estimation unit 84 may perform the method of FIG. 4 on a first set of vectors of coded units to determine the horizontal motion parameters and on a second set of vectors of coded units to determine the vertical motion parameters. The first and second sets of vectors of coded units may comprise the same set of vectors, two sets of parallel vectors (e.g., a first set of rows and a second set of rows), or sets of orthogonal vectors (e.g., a set of rows and a set of columns). For example, global MV parameter estimation unit 84 may perform the method of FIG. 4 for each row of a video frame to determine the horizontal global motion parameters and for each column to determine the vertical global motion parameters.

In general, a motion vector comprises two components: a horizontal component and a vertical component. For a general motion vector (MV_x, MV_y), MV_x is the horizontal component and MV_y is the vertical component. The techniques of this disclosure utilize horizontal and vertical components of macroblocks of a frame, which are arranged in a two-dimensional array pattern (i.e., a two-dimensional matrix). Accordingly, this disclosure refers to the horizontal component of a motion vector of column i in row j as $MV\_x_{ij}$. Similarly, this disclosure refers to the vertical component of a motion vector of row j in column i as $MV\_y_{ij}$. As noted above, the techniques of this disclosure may estimate the horizontal and vertical components of a global motion vector independently, and may use the same process for the horizontal and vertical components (e.g., swapping "horizontal" for "vertical" and "row" for "column"). Accordingly, the process will be described with respect to determining the horizontal global motion vector parameter from a plurality of rows for purposes of example, but it should be understood that similar techniques are used to determine the vertical global motion vector parameter, and that the techniques may be directed to determining either or both of the horizontal and the vertical global motion parameter from any general sets of vectors of pixels.

Initially, the method for determining the horizontal global motion parameter includes row-wise global parameter determination by a least squares solution, as described in greater detail below (108). In other examples, other techniques may be used for determining horizontal and vertical global motion parameters, e.g., using a random sample consensus (RANSAC). In particular, equation (6) below corresponds to the least squares solution. Equation (6) can be derived in the following manner. Let $MV\_x_{ij}$ be the horizontal motion vector component at the $i^{th}$ column in row j. Then, for each column in row j, global MV parameter estimation unit 84 calculates:

$$MV\_x_{1j} = b_{2\_row-j} \cdot x_1 + b_{1\_row-j} \quad (3)$$

$$MV\_x_{2j} = b_{2\_row-j} \cdot x_2 + b_{1\_row-j}$$

$$MV\_x_{3j} = b_{2\_row-j} \cdot x_3 + b_{1\_row-j}$$

$$\ldots$$

$$MV\_x_{Cj} = b_{2\_row-j} \cdot x_c + b_{1\_row-j}$$

where C is the largest column number and $x_1, x_2, \ldots, x_C$ are the column indices. The values of $b_{1\_row-j}$ and $b_{2\_row-j}$ correspond to horizontal motion vector candidates for row j. Ultimately, as explained in greater detail below, the best horizontal motion vector candidates for each row are selected as representative of that row, and a median value is selected from the set of horizontal motion vector candidates of the rows.

By replacing $\{x_1, x_2, \ldots, x_C\}$ with the index values $\{1, 2, \ldots, C\}$, global MV parameter estimation unit 84 obtains (as an example for row 1, that is, where j=1):

$$MV_x = XB, \quad (4)$$

where $$MV_x = \begin{bmatrix} MV_{x_1} \\ MV_{x_2} \\ MV_{x_3} \\ \ldots \\ MV_{x_c} \end{bmatrix}, X = \begin{bmatrix} 1 & 1 \\ 2 & 1 \\ 3 & 1 \\ \ldots & \ldots \\ C & 1 \end{bmatrix}, \text{ and } B = \begin{bmatrix} b_{2_{row1}} \\ b_{1_{row1}} \end{bmatrix}.$$

Equation (4) is an over-determined system with C linear equations and two unknowns (unknowns are the motion parameters $b_{1\_row-j}$ and $b_{2\_row-j}$ that global MV parameter estimation unit 84 is estimating). The goal is to find the "best" $b_{1\_row-j}$ and $b_{2\_row-j}$ i.e., which minimizes prediction error for each $MV\_x_{ij}$ of row j. That is, global MV parameter estimation unit 84 calculates:

$$\arg\min_{b} \sum_{i=1}^{C} \left| MV_{xi} - \sum_{k=1}^{2} x_{ik} b_k \right| \quad (5)$$

It should be noted that the k in equation (5) is used as a counter from 1 to 2. The unknowns $b_{1\_row\text{-}j}$ and $b_{2\_row\text{-}j}$ can be found by the following least squares solution:

$$B = (X^T X)^{-1} X^T MV_N \quad (6)$$

In order to find the unknown motion parameters $b_{1\_row\text{-}j}$ and $b_{2\_row\text{-}j}$ for each row, global MV parameter estimation unit 84 uses an inverse of a matrix resulting from the product of $X^T$ and X, namely, $(X^T X)$, where the inverse is expressed in formula (6) above as $(X^T X)^{-1}$. The matrix $X^T$ is the transpose matrix of X. For a fixed-size matrix X, the inverse, i.e., $(X^T X)^{-1}$, can be calculated beforehand. Global MV parameter estimation unit 84 generally does not use previously calculated inverse matrices is when global MV parameter, estimation unit 84 uses a metric, such as block variance, to determine unreliable motion vectors, and the number of equations used by global MV parameter estimation unit 84 is related to content. Even then, however, the matrix global MV parameter of which estimation unit 84 calculates the inverse is only 2×2 (in this example), with integer entries. Therefore, the inverse process is typically very low-complexity. An example of $(X^T X)^{-1}$ can be calculated as follows (again using j=1 as an example):

$$X^T X = \begin{bmatrix} 1 & 2 & \cdots & C \\ 1 & 1 & \cdots & 1 \end{bmatrix} \begin{bmatrix} 1 & 1 \\ 2 & 1 \\ 3 & 1 \\ \cdots & \cdots \\ C & 1 \end{bmatrix} \quad (7)$$

$$= \begin{bmatrix} \sum_{i=1}^{C} i^2 = \frac{C(C+1)(2C+1)}{6} & \sum_{i=1}^{C} i = \frac{C(C+1)}{2} \\ \sum_{i=1}^{C} i = \frac{C(C+1)}{2} & \sum_{i=1}^{C} 1^2 = C \end{bmatrix}$$

$$(X^T X)^{-1} = \begin{bmatrix} C & -\frac{C(C+1)}{2} \\ -\frac{C(C+1)}{2} & \frac{C(C+1)(2C+1)}{6} \end{bmatrix} \frac{12}{(C^2(C+1)(C-1))} \quad (8)$$

Once global MV parameter estimation unit 84 obtains $b_{1\_row\text{-}j}$ and $b_{2\_row\text{-}j}$, global MV parameter estimation unit 84 finds the estimation error for the row, e.g., the error for row 1, via the following equation:

$$Err_{row1} = |MV_x - XB| \quad (9).$$

That is, using the value of $(X^T X)^{-1}$ from equation (8), global MV parameter estimation unit 84 determines the values of $b_{1\_row\text{-}1}$ and $b_{2\_row\text{-}1}$ according to equation (6) above.

After obtaining $\{b_{1\_row1}, b_{2\_row1}, Err_{row1}\}$ for first row, global MV parameter estimation unit 84 repeats the same procedure for all the rows and obtains motion and error parameters for the rest of the rows, substituting the row number for j where indicated above (110). After performing the above steps for each j in the inclusive set [n, R–n], where n represents the index of the smallest row and R–n represents the index of the largest row, global MV parameter estimation unit 84 obtains a result of:

$\{b_{1\_rown}, b_{2\_rown}, Err_{rown}\}$ $\{b_{1\_rown+1}, b_{2\_rown+1}, Err_{rown+1}\}$

...

$\{b_{1\_rowR-n}, b_{2\_rowR-n}, Err_{rowR-n}\}$

In examples for which a metric, such as block variance, is used for detecting unreliable motion vectors, the corresponding equations may be eliminated from the least square solution. For example, if the motion vector in the $3^{rd}$ column of the first row is unreliable, global MV parameter estimation unit 84 reduces the number of equations to C−1. Note that to have valid solution for Equation (6), global MV parameter estimation unit 84 needs to have at least two "good" (that is, reliable) motion vectors in a row. However, more motion vectors may generally result in a better approximation of global motion parameters.

Next, global MV parameter estimation unit 84 combines motion parameters from each row to obtain global motion parameters for the frame for which the global motion parameters are being estimated (112). In order to obtain global parameters for the whole frame, global MV parameter estimation unit 84 nonlinearly combines the parameters of each row through a median filtering operation. However, global MV parameter estimation unit 84 uses an estimation error as a fidelity metric to judge whether the parameters for a particular row should be included in filtering or not. If the fitting error is bigger than a threshold then global MV parameter estimation unit 84 discards that particular row. If the error is less than the threshold, then global MV parameter estimation unit 84 obtains the final global motion parameters $b_1$, $b_2$ by:

$b_1$=median{row-set($b_1$)}, where row-$i$ is in row-set if $Err_{row\text{-}i} < TH$ $b_2$=median{row-set($b_2$)}, where row-$i$ is in row-set if $Err_{row\text{-}i} < TH$ Median{X} finds the median value of set X. Row-set($b_n$) is the set of $b_n$ values from the rows of the frame for which the global motion parameters are being calculated that are determined to have an error that is less than a threshold. Because global MV parameter estimation unit 84 may potentially select any member of the set row-set (e.g., $b_{1\_row\text{-}i}$ for any i in row-set as $b_1$, and $b_{2\_row\text{-}i}$ for any i in row-set as $b_2$) to be used as the horizontal motion component, the elements of row-set($b_n$) may be referred to as "horizontal parameter candidates." Although the example value of 10 is used for the threshold above, other values may be used, and the threshold value may be configurable. Row-set($b_1$) refers to the set of values $b_1$ of row-set, i.e., the set of $b_1$ values for each of the rows in row-set. Similarly, row-set($b_2$) refers to the set of $b_2$ values of row-set.

After performing the steps above, global MV parameter estimation unit 84 will have determined $\{b_1, b_2\}$ as the final, horizontal global motion parameters. Global MV parameter estimation unit 84 may then perform similar steps to determine $\{c_1, c_2\}$ (114-118). However, to determine the vertical parameters, global MV parameter estimation unit 84 processes the block-based motion vectors in the column wise direction. Global MV parameter estimation unit 84 may similarly generate a "column-set" including a plurality of vertical parameter candidates, from which a median value may be selected and used as the vertical parameter or set of vertical parameters, e.g., $\{c_1, c_2\}$. The equation that solves for best motion parameters for the vertical parameters is given by (using column i=1 as an example):

$$C = (Y^T Y)^{-1} Y^T MV_y \qquad (10)$$

where $$MV_Y = \begin{bmatrix} MV_{Y_1} \\ MV_{Y_2} \\ MV_{Y_3} \\ \ldots \\ MV_{Y_R} \end{bmatrix}, Y = \begin{bmatrix} 1 & 1 \\ 2 & 1 \\ 3 & 1 \\ \ldots & \ldots \\ R & 1 \end{bmatrix}, \text{ and } C = \begin{bmatrix} c_{2_{col1}} \\ c_{1_{col1}} \end{bmatrix}$$

After obtaining $\{c_{1\_col-i}, c_{2\_col-i}, \text{Err}_{col-i}\}$ for each column, global MV parameter estimation unit 84 repeats the combination of column wise estimations to obtain global vertical motion parameters for the frame, i.e., $\{c_1, c_2\}$.

Having calculated the global horizontal and vertical motion parameters for the frame, global MV parameter estimation unit 84 can calculate a global motion vector for a block at location (i, j), that is, a block at row j and column i, using the model described by equations 1 and 2. In particular, the motion vector for a block at (i, j) is (MV_$x_i$, MV_$y_j$), where MV_$x_i$ and MV_$y_j$ are determined according to the global motion parameters $\{b_1, b_2, c_1, c_2\}$ calculated according to the method of FIG. 4, such that:

$$MV\_x_i = b_2 * x_i + b_1$$

$$MV\_y_j = c_2 * y_j + c_1$$

After having obtained the global motion parameters, the global motion parameters may be used by video decoder 30 to interpolate a frame as part of FRUC, used by video encoder 20 to reduce camera jitter artifacts, or used in other processes in which global motion parameters may be used, as may be appreciated by those of skill in the art.

An example method conforming to FIG. 4 may include determining, with a video coder, for a plurality of coded units of a portion of a video frame, wherein the coded units are arranged in a plurality of rows and a plurality of columns, a set of horizontal parameter candidates for a horizontal parameter of a global motion model for the portion of the video frame, wherein each of the horizontal parameter candidates corresponds to one of the plurality of rows (or columns, or vectors generally), selecting, with the video coder, a median value from the set of horizontal parameter candidates as the horizontal parameter of the global motion model for the portion of the video frame, determining, with the video coder, a set of vertical parameter candidates for a vertical parameter of the global motion model for the portion of the video frame, wherein each of the vertical parameter candidates corresponds to one of the plurality of columns (or rows, or vectors generally), and selecting, with the video coder, a median value from the set of vertical parameter candidates as the vertical parameter of the global motion model for the portion of the video frame. In other examples, rather than selecting a median value, a vector median, a weighted median, a weighted mean, a mean, or other value used as part of a smoothing technique may be selected.

The method of FIG. 4 may present several advantages. For example, because the method is of fairly low complexity, the method may be implemented in software (that is, instructions corresponding to the method of FIG. 4 may be encoded in a computer-readable medium, such as a computer-readable storage medium, and executed by a processor). As another example, a DSP may be configured to perform the method of FIG. 4 and connected to an existing hardware architecture, without requiring a change to hardware architecture.

Likewise, the method of FIG. 4 is flexible, in that the method can be used to support different types of global motion. That is, the techniques may be used to produce global motion parameters of models other than the simplified affine model of the example above. The method of FIG. 4 may be applied to perspective models, for example. Although primarily discussed with respect to producing global motion parameters for a frame, the method of FIG. 4 may be used to produce global motion parameters for a specific area of a frame, rather than for an entire frame. In this manner, the method of FIG. 4 may be used to produce global motion parameters of any specified region of a frame. In some examples, a specification of a region of a frame may be received as an input in addition to the inputs for the method described above. Similarly, the specification of the region may be determined prior to executing the method, e.g., by using particular error criteria, such as a specific error value for each vector, e.g., row or column $\{\text{Err\_row}_i, \text{Err\_col}_i\}$.

Furthermore, the method may be applied to any type of motion vectors. That is, the block-based motion vectors may come from any type of motion estimation algorithm. As one example, the motion vectors may be complex or simple block based motion vectors produced by a video encoder motion estimation algorithm. As another example, a video front end component may provide a set of global motion vectors to which to apply the method of FIG. 4.

Use of the method of FIG. 4 may also result in other advantages. As one example, use of the method of FIG. 4 may result in more efficient use of memory. For example, rather than saving motion vectors for all of the blocks of a frame (or region of a frame), a coding device may save just the global motion parameters and generate a motion vector field therefrom when motion vectors are needed. In addition, the method of FIG. 4 may be used to generate a confidence value, which may be used to inform a video post-processing application an amount of global motion in a scene/frame. The confidence value may be derived from fitting error $\{\text{Err\_row}_i, \text{Err\_col}_i\}$.

Figure 5:
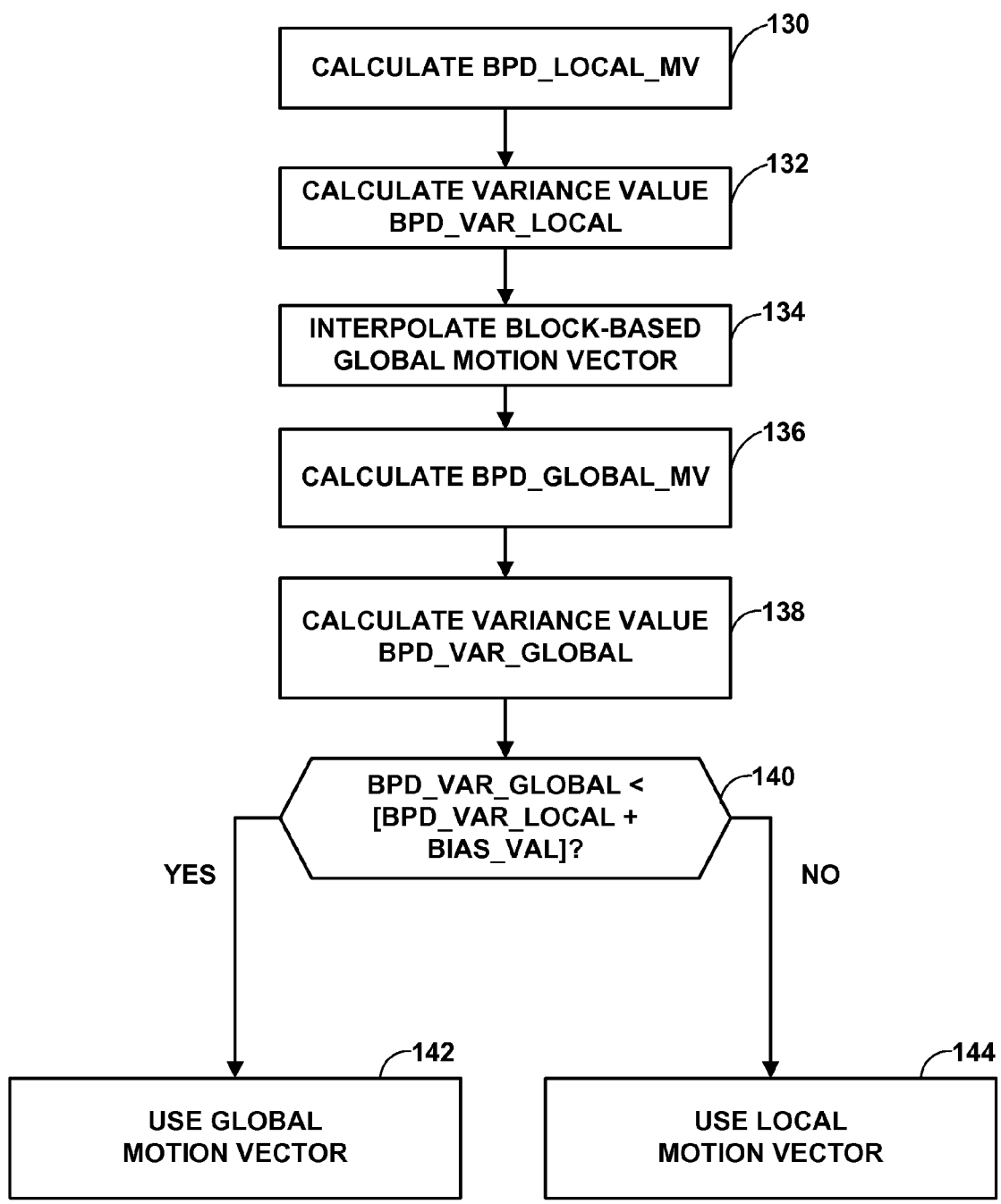
FIG. 5 is a flowchart illustrating an example method for determining whether to use a block-based motion vector or a global motion vector when interpolating a block of an interpolated frame during a frame rate up-conversion process (FRUC).

FIG. 5 is a flowchart illustrating an example method for determining whether to use a block-based motion vector or a global motion vector when interpolating a block of an interpolated FRUC frame during a frame rate up-conversion process. Video decoder 30, or a specific FRUC unit thereof, may be configured to perform the method of FIG. 5. Likewise, other devices, modules, or units may be configured to perform the method of FIG. 5. The global motion parameters may be used to interpolate a frame as part of a FRUC process, in one example, according to the method of FIG. 5. Additionally, a decision metric may be used to determine whether, for a particular block, to interpolate a block-specific motion vector or to use a global motion vector for the block that is calculated using the global motion parameters.

In some examples, a bidirectional prediction difference (BPD) variance metric may be used as the decision metric. To calculate the BPD variance metric for a particular block at position (x, y) of an interpolated frame t_half (occurring temporally between frames t−1 and t), the following formula may be used:

$$BPD(x,y,t\_\text{half}) = |F(x-MV\_x/2, y-MV\_y/2, t-1) - F(x+MV\_x/2, y+MV\_y/2, t)|$$

where F(x, y, t) in the above formula represents the video frame. For example F(x, y, t) is a pixel value at xth and yth location within a video frame captured at time t. Similarly, F(x−MV_x/2, y−MV_y/2, t−1) is the pixel in (x−MVx/2)th and (y−MV_y/2)th location within a video frame captured at time t−1. For different applications, different metrics can be used. For example if global/local motion decision is to be used during video compression, one can compare the SAD (sum of absolute difference metric), or the variance of SAD for local and global motion vectors.

Initially, video decoder 30 calculates bidirectional prediction difference for a motion vector from an existing block-based motion vector for a block being interpolated (referred to as "BPD_local_MV" in FIG. 5) of a FRUC frame (130). Video decoder 30 then calculates a local BPD variance value for the block according to the BPD_local_MV using the BPD formula described above (referred to as "BPD_var_local" in FIG. 5) (132).

Next, video decoder 30 interpolates block-based global motion vectors using the global motion parameters determined according to the method of FIG. 4 (134). Video decoder 30 then calculates a bipredictional prediction difference of motion vector for the block being interpolated according to the global motion vectors (referred to as "BPD_global_MV" in FIG. 5) (136). Global_MV is the motion vector interpolated by using estimated global motion parameters. BPD_GLOBAL_MV is the bidirectional prediction difference due to (or estimated by using) Global_MV. Video decoder 30 then calculates a variance value for a block according to BPD_global_MV (referred to as "BPD_var_global" in FIG. 5) (138).

Video decoder 30 may then compare the variance value for the block as interpolated using the local motion vector (that is, BPD_var_local) to the variance value for the block as interpolated using the global motion vector (that is, BPD_var_global) (140). In some examples, as shown in FIG. 5, video decoder 30 may additionally apply a scaling factor and/or a bias value (referred to as "bias_val" in FIG. 5) to BPD_var_local, to influence the decision in favor of using the global motion vectors. The scaling factor can be represented by alpha x [BPD_VAR_LOCAL+BIAS_VAL] in unit 140 for the example of FIG. 5 The bias value may be particularly configured to weight the decision toward using the global motion vectors more or less heavily, depending upon user preference.

When the variance value for the block interpolated using the global motion vector is less than the variance value for the block interpolated using the local motion vector plus the bias value ("YES" branch of 140), video decoder 30 interpolates the block of the FRUC frame (that is, the block at position (x, y) of the FRUC frame) according to the global motion vector (142). On the other hand, when the variance value for the block interpolated using the global motion vector is greater than or equal to the variance value for the block interpolated using the local motion vectors plus the bias value, video decoder 30 interpolates the block of the FRUC frame according to the local motion vector (144). In this manner, video decoder 30 may determine, for each block of a FRUC frame being interpolated, whether to interpolate the block using global motion vectors (global parameters for which may be calculated according to the method of FIG. 4) or to interpolate the block using local, block-based, interpolated motion vectors.

Figure 6:
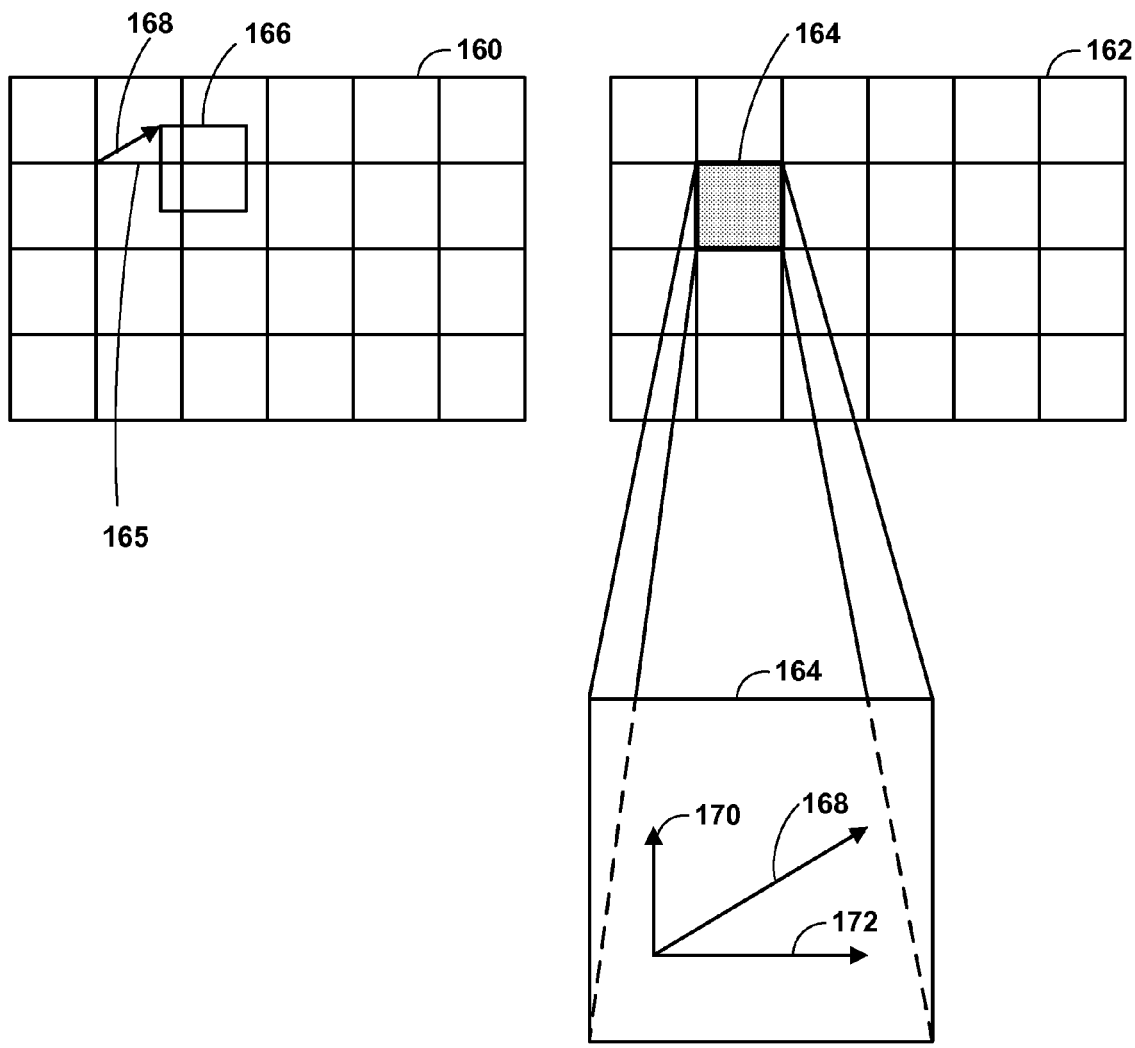
FIG. 6 is a conceptual diagram illustrating an example motion vector and horizontal and vertical components of the motion vector.

FIG. 6 is a conceptual diagram illustrating example motion vector 168 and horizontal and vertical components thereof. FIG. 6 depicts two frames: encoded frame 162 and reference frame 164. Encoded frame 162 may comprise an inter-coded frame, such as a frame encoded as a P-frame or a B-frame. Encoded frame 162 may be encoded according to one or more references to reference frame 164. Encoded frame 162 comprises a plurality of macroblocks, including example macroblock 164. The block unit for the block-based motion vector is not restricted to a macroblock size of 16×16 pixels, but can be any block size such as, for example, 8×8, 4×4, 32×32, or any other number of pixels.

In the example of FIG. 6, macroblock 164 includes motion vector 168. In general, motion vector 168 describes the location of block 166, with respect to co-located block 165 of reference frame 164, that is determined to best correspond to the pixel data of macroblock 164, e.g., as a result of a motion estimation process. A video encoder, such as video encoder 20, may calculate motion vector 168, such that a video decoder, such as video decoder 30, may use the pixel data of block 166 in reference frame 164 as at least a portion of the pixel data of macroblock 164 when decoding encoded frame 162.

As further illustrated by FIG. 6, motion vector 168 for macroblock 164 includes vertical component 170 and horizontal component 172. Assuming that macroblock 164 occurs at row 2 and column 2, as illustrated in the example of FIG. 6, horizontal component $MV\_x_{22}$ would equal the value of horizontal component 172, while vertical component $MV\_y_{22}$ would equal the value of vertical component 170, per the description of the method of FIG. 4. Each of the blocks of encoded frame 162 may include respective motion vectors with respective horizontal and vertical components.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) (i.e., a chip) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various examples have been described. These and other examples are within the scope of the following claims.

The invention claimed is:

1. A method comprising:
determining, with a video processing device, for a plurality of coded units arranged in a plurality of vectors from a portion of a video frame, a first set of horizontal parameter candidates for a first horizontal parameter of a global motion model for the portion of the video frame without requiring access to pixel values of the video frame, wherein each of the horizontal parameter candidates of the first set of horizontal parameter candidates corresponds to one of a first subset of the plurality of vectors;
selecting, with the video processing device, a median value from the first set of horizontal parameter candidates as the first horizontal parameter of the global motion model for the portion of the video frame;
determining, with the video processing device, a first set of vertical parameter candidates for a first vertical parameter of the global motion model for the portion of the video frame without requiring access to the pixel values of the video frame, wherein each of the vertical parameter candidates of the first set of vertical parameter candidates corresponds to one of a second subset of the plurality of vectors;
selecting, with the video processing device, a median value from the first set of vertical parameter candidates as the first vertical parameter of the global motion model for the portion of the video frame;
determining a second set of horizontal parameter candidates for a second horizontal parameter of the global motion model, wherein each of the horizontal parameter candidates of the second set of horizontal parameter candidates corresponds to one of the first subset of the plurality of vectors;
selecting a median value from the second set of horizontal parameter candidates as the second horizontal parameter of the global motion model for the portion of the video frame;
determining a second set of vertical parameter candidates for a second vertical parameter of the global motion model, wherein each of the vertical parameter candidates of the second set of vertical parameter candidates corresponds to one of the second subset of the plurality of vectors;
selecting a median value from the second set of vertical parameter candidates as the second vertical parameter of the global motion model for the portion of the video frame; and
processing, with the video processing device, at least one of the plurality of coded units according to the first and second horizontal parameters and the first and second vertical parameters,
wherein the global motion model comprises an affine model that is expressed as:

$$MV\_x_i = b_2 * x_i + b_1,$$

and $$MV\_y_j = c_2 * y_j + c_1,$$

wherein the first horizontal parameter comprises $b_1$, the first vertical parameter comprises $c_1$, the second horizontal parameter comprises $b_2$, the second vertical parameter comprises $c_2$, $x_i$ comprises a row index, $y_j$ comprises a column index, $MV\_x_i$ comprises a horizontal motion vector component, and $MV\_y_j$ comprises a vertical motion vector component, wherein determining the first set of horizontal parameter candidates and determining the second set of horizontal parameter candidates comprises calculating, for each vector i, a value for $B_i$, where $B_i$ comprises a matrix $$\begin{bmatrix} b_{2_{vector-i}} \\ b_{1_{vector-i}} \end{bmatrix},$$

wherein the first set of horizontal parameter candidates comprises $b_{1\_vector-i}$ for each vector i, wherein the second set of horizontal parameter candidates comprises $b_{2\_vector-i}$ for each vector i, and wherein calculating the value of $B_i$ comprises calculating $(X^TX)^{-1}X^TMV_x$, wherein X comprises a matrix $$\begin{bmatrix} 1 & i \\ 2 & i \\ \dots & \dots \\ C & i \end{bmatrix},$$

wherein C corresponds to a number of vectors in the second subset of the plurality of vectors, wherein $X^T$ comprises a transpose matrix of X, and wherein $MV_x$ comprises a matrix $$\begin{bmatrix} 1*b_{2\_vector-i} + b_{1\_vector-i} \\ 2*b_{2\_vector-i} + b_{1\_vector-i} \\ \dots \\ C*b_{2\_vector-i} + b_{1\_vector-i} \end{bmatrix},$$

and wherein determining the first set of vertical parameter candidates and determining the second set of vertical parameter candidates comprises calculating, for each vector j, a value for $C_j$, where $C_j$ comprises a matrix $$\begin{bmatrix} c_{2_{vector-j}} \\ c_{1_{column-j}} \end{bmatrix},$$

wherein the first set of vertical parameter candidates comprises $c_{i\_vector-j}$ for each vector j, wherein the second set of vertical parameter candidates comprises $c_{2\_vector-j}$ for each vector j, and wherein calculating the value of $C_j$ comprises calculating $(Y^TY)^{-1}Y^TMV_y$, wherein Y comprises a matrix $$\begin{bmatrix} 1 & i \\ 2 & i \\ \dots & \dots \\ R & i \end{bmatrix},$$

wherein R corresponds to a number of vectors in the first subset of the plurality of vectors, wherein $Y^T$ comprises a transpose matrix of Y, and wherein $MV_y$ comprises a matrix $$\begin{bmatrix} 1^*c_{2\_vector-j} + c_{1\_vector-j} \\ 2^*c_{2\_vector-j} + c_{1\_vector-j} \\ \dots \\ R^*c_{2\_vector-j} + c_{1\_vector-j} \end{bmatrix}.$$

2. The method of claim 1, wherein the first subset of the plurality of vectors and the second subset of the plurality of vectors comprise the same subset.

3. The method of claim 1, wherein the plurality of coded units are arranged in rows and columns, wherein the first subset of the plurality of vectors corresponds to a subset of the rows, and wherein the second subset of the plurality of vectors corresponds to a subset of the columns.

4. The method of claim 1, further comprising calculating a value for $(X^TX)^{-1}$ prior to determining the first set of horizontal parameter candidates and determining the second set of horizontal parameter candidates, and calculating a value for $(Y^TY)^{-1}$ prior to determining the first set of vertical parameter candidates and determining the second set of vertical parameter candidates.

5. The method of claim 1, further comprising:
 removing, prior to calculating $B_i$, elements for which a block variance value of a corresponding block in vector i exceeds a threshold from the matrix X, the matrix $X^T$, and the matrix $MV_x$, for each vector i; and
 removing, prior to calculating $C_j$, elements for which a block variance value of a corresponding block in vector j exceeds a threshold from the matrix Y, the matrix $Y^T$, and the matrix $MV_y$, for each vector j.

6. The method of claim 1, further comprising:
 calculating error values for each of the horizontal parameter candidates of the first set and the second set of horizontal parameter candidates;
 removing each of the horizontal parameter candidates from the first set and the second set of horizontal parameter candidates for which the calculated error value is below a first threshold prior to selecting a median value from the first set and the second set of horizontal parameter candidates;
 calculating error values for each of the vertical parameter candidates of the first set and the second set of vertical parameter candidates; and
 removing each of the vertical parameter candidates from the first set and the second set of vertical parameter candidates for which the calculated error value is below a second threshold prior to selecting a median value from the first set and the second set of vertical parameter candidates.

7. The method of claim 1, further comprising generating a frame rate upconversion (FRUC) frame using a global motion vector calculated according to the horizontal parameters and the vertical parameters of the global motion model.

8. The method of claim 1, further comprising correcting one or more camera jitter artifacts by using a global motion vector calculated according to the horizontal parameters and the vertical parameters of the global motion model.

9. An apparatus comprising a video processing device configured to:
 determine, for a plurality of coded units of a portion of a video frame, wherein the coded units are arranged in a plurality of vectors, a first set of horizontal parameter candidates for a first horizontal parameter of a global motion model for the portion of the video frame without requiring access to pixel values of the video frame, wherein each of the horizontal parameter candidates of the first set of horizontal parameter candidates corresponds to one of a first subset of the plurality of vectors;
 select a median value from the first set of horizontal parameter candidates as the first horizontal parameter of the global motion model for the portion of the video frame;
 determine a first set of vertical parameter candidates for a first vertical parameter of the global motion model for the portion of the video frame without requiring access to the pixel values of the video frame, wherein each of the vertical parameter candidates of the first set of vertical parameter candidates corresponds to one of a second subset of the plurality of vectors;
 select a median value from the first set of vertical parameter candidates as the first vertical parameter of the global motion model for the portion of the video frame; and
 determine a second set of horizontal parameter candidates for a second horizontal parameter of the global motion model, wherein each of the horizontal parameter candidates of the second set of horizontal parameter candidates corresponds to one of the first subset of the plurality of vectors;
 select a median value from the second set of horizontal parameter candidates as the second horizontal parameter of the global motion model for the portion of the video frame;
 determine a second set of vertical parameter candidates for a second vertical parameter of the global motion model, wherein each of the vertical parameter candidates of the second set of vertical parameter candidates corresponds to one of the second subset of the plurality of vectors;
 select a median value from the second set of vertical parameter candidates as the second vertical parameter of the global motion model for the portion of the video frame; and
 process at least one of the plurality of coded units according to the first and second horizontal parameters and the first and second vertical parameters,
 wherein the global motion model comprises an affine model that is expressed as:

$MV\_x_i = b_2{}^*x_i + b_1$, and $MV\_y_j = c_2{}^*y_j + c_1$, wherein the first horizontal parameter comprises $b_1$, the first vertical parameter comprises $c_1$, the second horizontal parameter comprises $b_2$, the second vertical parameter comprises $c_2$ $x_i$ comprises a row index, $y_j$ comprises a column index, MV_x, comprises a horizontal motion vector component, and $MV\_y_j$ comprises a vertical motion vector component, wherein determining the first set of horizontal parameter candidates and determining the second set of horizontal parameter candidates comprises calculating, for each vector i, a value for $B_i$, where $B_i$ comprises a matrix $$\begin{bmatrix} b_{2_{vector-i}} \\ b_{1_{vector-i}} \end{bmatrix},$$

wherein the first set of horizontal parameter candidates comprises $b_{1\_vector-i}$ for each vector i, wherein the second set of horizontal parameter candidates comprises $b_{2\_vector-i}$ for each vector i, and wherein calculating the value of $B_i$ comprises calculating $(X^T X)^{-1} X^T MV_x$, wherein X comprises a matrix $$\begin{bmatrix} 1 & i \\ 2 & i \\ \ldots & \ldots \\ C & i \end{bmatrix},$$

wherein C corresponds to a number of vectors in the second subset of the plurality of vectors, wherein $X^T$ comprises a transpose matrix of X, and wherein $MV_x$ comprises a matrix $$\begin{bmatrix} 1^* b_{2\_vector-i} + b_{1\_vector-i} \\ 2^* b_{2\_vector-i} + b_{1\_vector-i} \\ \ldots \\ C^* b_{2\_vector-i} + b_{1\_vector-i} \end{bmatrix},$$

and
wherein determining the first set of vertical parameter candidates and determining the second set of vertical parameter candidates comprises calculating, for each vector j, a value for $C_j$, where $C_j$ comprises a matrix $$\begin{bmatrix} c_{2_{vector-j}} \\ c_{1_{vector-j}} \end{bmatrix},$$

wherein the first set of vertical parameter candidates comprises $c_{1\_vector-j}$ for each vector j, wherein the second set of vertical parameter candidates comprises $c_{2\_vector-j}$ for each vector j, and wherein calculating the value of $C_j$ comprises calculating $(Y^T Y)^{-1} Y^T MV_y$, wherein Y comprises a matrix $$\begin{bmatrix} 1 & i \\ 2 & i \\ \ldots & \ldots \\ R & i \end{bmatrix},$$

wherein R corresponds to a number of vectors in the first subset of the plurality of vectors, wherein $Y^T$ comprises a transpose matrix of Y, and wherein $MV_y$ comprises a matrix $$\begin{bmatrix} 1 * c_{2\_vector-j} + c_{1\_vector-j} \\ 2 * c_{2\_vector-j} + c_{1\_vector-j} \\ \ldots \\ R * c_{2\_vector-j} + c_{1\_vector-j} \end{bmatrix}.$$

10. The apparatus of claim 9, wherein the first subset of the plurality of vectors and the second subset of the plurality of vectors comprise the same subset.

11. The apparatus of claim 9, wherein the plurality of coded units are arranged in rows and columns, wherein the first subset of the plurality of vectors corresponds to a subset of the rows, and wherein the second subset of the plurality of vectors corresponds to a subset of the columns.

12. The apparatus of claim 9, wherein the video processing device is further configured to calculate a value for $(X^T X)^{-1}$ prior to determining the first set of horizontal parameter candidates and determining the second set of horizontal parameter candidates, and to calculate a value for $(Y^T Y)^{-1}$ prior to determining the first set of vertical parameter candidates and determining the second set of vertical parameter candidates.

13. The apparatus of claim 9, wherein the video processing device is further configured to:
  remove, prior to calculating $B_i$, elements from the matrix X, the matrix $X^T$, and the matrix $MV_x$ for which a block variance value of a corresponding block in vector i exceeds a threshold, for each vector i; and
  remove, prior to calculating $C_j$, elements from the matrix Y, the matrix $Y^T$, and the matrix $MV_y$ for which a block variance value of a corresponding block in vector j exceeds a threshold, for each vector j.

14. The apparatus of claim 9, wherein the video processing device is further configured to:
  calculate error values for each of the horizontal parameter candidates of the first set and the second set of horizontal parameter candidates;
  remove each of the horizontal parameter candidates from the first set and the second set of horizontal parameter candidates for which the calculated error value is below a first threshold prior to selecting a median value from the first set and the second set of horizontal parameter candidates;
  calculate error values for each of the vertical parameter candidates of the first set and the second set of vertical parameter candidates; and
  remove each of the vertical parameter candidates from the first set and the second set of vertical parameter candidates for which the calculated error value is below a second threshold prior to selecting a median value from the first set and the second set of vertical parameter candidates.

15. The apparatus of claim 9, wherein the video processing device is further configured to calculate a global motion vector according to the horizontal parameters and the vertical parameters of the global motion model and use the global motion vector to at least one of generate a frame rate upconversion (FRUC) frame and correct one or more camera jitter artifacts.

16. The apparatus of claim 9, wherein the apparatus comprises at least one of:
  an integrated circuit;
  a microprocessor; and
  a wireless communication device that includes the video processing device.

17. An apparatus comprising:
  means for determining, for a plurality of coded units of a portion of a video frame, wherein the coded units are arranged in a plurality of vectors, a first set of horizontal parameter candidates for a first horizontal parameter of a global motion model for the portion of the video frame without requiring access to pixel values of the video frame, wherein each of the horizontal parameter candidates of the first set of horizontal parameter candidates corresponds to one of a first subset of the plurality of vectors;
  means for selecting a median value from the first set of horizontal parameter candidates as the first horizontal parameter of the global motion model for the portion of the video frame;

means for determining a first set of vertical parameter candidates for a first vertical parameter of the global motion model for the portion of the video frame without requiring access to the pixel values of the video frame, wherein each of the vertical parameter candidates of the first set of vertical parameter candidates corresponds to one of a second subset of the plurality of vectors;

means for selecting a median value from the first set of vertical parameter candidates as the first vertical parameter of the global motion model for the portion of the video frame;

means for determining a second set of horizontal parameter candidates for a second horizontal parameter of the global motion model, wherein each of the horizontal parameter candidates of the second set of horizontal parameter candidates corresponds to one of the first subset of the plurality of vectors;

means for selecting a median value from the second set of horizontal parameter candidates as the second horizontal parameter of the global motion model for the portion of the video frame;

means for determining a second set of vertical parameter candidates for a second vertical parameter of the global motion model, wherein each of the vertical parameter candidates of the second set of vertical parameter candidates corresponds to one of the second subset of the plurality of vectors;

means selecting a median value from the second set of vertical parameter candidates as the second vertical parameter of the global motion model for the portion of the video frame; and means for processing at least one of the plurality of coded units according to the first and second horizontal parameters and the first and second vertical parameters, wherein the global motion model comprises an affine model that is expressed as:

$$MV\_x_i = b_2 * x_i + b_1,$$

and $$MV\_y_j = c_2 * y_j + c_1,$$

wherein the first horizontal parameter comprises $b_1$, the first vertical parameter comprises $c_1$, the second horizontal parameter comprises $b_2$, the second vertical parameter comprises $c_2$, $x_i$ comprises a row index, $y_j$ comprises a column index, $MV\_x_i$ comprises a horizontal motion vector component, and $MV\_y_j$ comprises a vertical motion vector component, wherein determining the first set of horizontal parameter candidates and determining the second set of horizontal parameter candidates comprises calculating, for each vector i, a value for $B_i$, where $B_i$ comprises a matrix $$\begin{bmatrix} b_{2\_vector-i} \\ b_{1\_vector-i} \end{bmatrix},$$

wherein the first set of horizontal parameter candidates comprises $b_{1\_vector-i}$ for each vector i, wherein the second set of horizontal parameter candidates comprises $b_{2\_vector-i}$ for each vector i, and wherein calculating the value of $B_i$ comprises calculating $(X^T X)^{-1} X^T MV_x$, wherein X comprises a matrix $$\begin{bmatrix} 1 & i \\ 2 & i \\ \ldots & \ldots \\ C & i \end{bmatrix},$$

wherein C corresponds to a number of vectors in the second subset of the plurality of vectors, wherein $X^T$ comprises a transpose matrix of X, and wherein $MV_x$ comprises a matrix $$\begin{bmatrix} 1 * b_{2\_vector-i} + b_{1\_vector-i} \\ 2 * b_{2\_vector-i} + b_{1\_vector-i} \\ \ldots \\ C * b_{2\_vector-i} + b_{1\_vector-i} \end{bmatrix},$$

and wherein determining the first set of vertical parameter candidates and determining the second set of vertical parameter candidates comprises calculating, for each vector j, a value for $C_j$, where $C_j$ comprises a matrix $$\begin{bmatrix} c_{2\_vector-j} \\ c_{1\_vector-j} \end{bmatrix},$$

wherein the first set of vertical parameter candidates comprises $c_{1\_vector-j}$ for each vector j, wherein the second set of vertical parameter candidates comprises $c_{2\_vector-j}$ for each vector j, and wherein calculating the value of $C_j$ comprises calculating $(Y^T Y)^{-1} Y^T MV_y$, wherein Y comprises a matrix $$\begin{bmatrix} 1 & i \\ 2 & i \\ \ldots & \ldots \\ R & i \end{bmatrix},$$

wherein R corresponds to a number of vectors in the first subset of the plurality of vectors, wherein $Y^T$ comprises a transpose matrix of Y, and wherein $MV_y$ comprises a matrix $$\begin{bmatrix} 1 * c_{2\_vector-j} + c_{1\_vector-j} \\ 2 * c_{2\_vector-j} + c_{1\_vector-j} \\ \ldots \\ R * c_{2\_vector-j} + c_{1\_vector-j} \end{bmatrix}.$$

18. The apparatus of claim 17, wherein the first subset of the plurality of vectors and the second subset of the plurality of vectors comprise the same subset.

19. The apparatus of claim 17, wherein the plurality of coded units are arranged in rows and columns, wherein the first subset of the plurality of vectors corresponds to a subset of the rows, and wherein the second subset of the plurality of vectors corresponds to a subset of the columns.

20. The apparatus of claim 17, further comprising means for calculating a value for $(X^T X)^{-1}$ prior to determining the first set of horizontal parameter candidates and determining the second set of horizontal parameter candidates, and means for calculating a value for $(Y^TY)^{-1}$ prior to determining the first set of vertical parameter candidates and determining the second set of vertical parameter candidates.

21. The apparatus of claim 17, further comprising:
means for removing, prior to calculating $B_i$, elements for which a block variance value of a corresponding block in vector i exceeds a threshold from the matrix X, the matrix $X^T$, and the matrix $MV_x$, for each vector i; and
means for removing, prior to calculating $C_j$, elements for which a block variance value of a corresponding block in vector j exceeds a threshold from the matrix Y, the matrix $Y^T$, and the matrix $MV_y$, for each vector j.

22. The apparatus of claim 17, further comprising:
means for calculating error values for each of the horizontal parameter candidates of the first set and the second set of horizontal parameter candidates;
means for removing each of the horizontal parameter candidates from the first set and the second set of horizontal parameter candidates for which the calculated error value is below a first threshold prior to selecting a median value from the first set and the second set of horizontal parameter candidates;
means for calculating error values for each of the vertical parameter candidates of the first set and the second set of vertical parameter candidates; and
means for removing each of the vertical parameter candidates from the first set and the second set of vertical parameter candidates for which the calculated error value is below a second threshold prior to selecting a median value from the first set and the second set of vertical parameter candidates.

23. The apparatus of claim 17, further comprising means for generating a frame rate upconversion (FRUC) frame using a global motion vector calculated according to the horizontal parameters and the vertical parameters of the global motion model.

24. The apparatus of claim 17, further comprising means for correcting one or more camera jitter artifacts by using a global motion vector calculated according to the horizontal parameters and the vertical parameters of the global motion model.

25. A non-transitory computer-readable storage medium encoded with instructions for causing a programmable processor of a video processing device to:
determine for a plurality of coded units of a portion of a video frame, wherein the coded units are arranged in a plurality of vectors, a first set of horizontal parameter candidates for a first horizontal parameter of a global motion model for the portion of the video frame without requiring access to pixel values of the video frame, wherein each of the horizontal parameter candidates of the first set of horizontal parameter candidates corresponds to one of a first subset of the plurality of vectors;
select a median value from the first set of horizontal parameter candidates as the first horizontal parameter of the global motion model for the portion of the video frame;
determine a first set of vertical parameter candidates for a first vertical parameter of the global motion model for the portion of the video frame without requiring access to the pixel values of the video frame, wherein each of the vertical parameter candidates of the first set of vertical parameter candidates corresponds to one of a second subset of the plurality of vectors;
select a median value from the first set of vertical parameter candidates as the first vertical parameter of the global motion model for the portion of the video frame; and
determine a second set of horizontal parameter candidates for a second horizontal parameter of the global motion model, wherein each of the horizontal parameter candidates of the second set of horizontal parameter candidates corresponds to one of the first subset of the plurality of vectors;
select a median value from the second set of horizontal parameter candidates as the second horizontal parameter of the global motion model for the portion of the video frame;
determine a second set of vertical parameter candidates for a second vertical parameter of the global motion model, wherein each of the vertical parameter candidates of the second set of vertical parameter candidates corresponds to one of the second subset of the plurality of vectors;
select a median value from the second set of vertical parameter candidates as the second vertical parameter of the global motion model for the portion of the video frame; and
process at least one of the plurality of coded units according to the first and second horizontal parameters and the first and second vertical parameters,
wherein the global motion model comprises an affine model that is expressed as:

$$MV\_x_i = b_2 * x_i + b_1,$$

and $$MV\_y_j = c_2 * y_j + c_1,$$

wherein the first horizontal parameter comprises $b_1$, the first vertical parameter comprises $c_1$, the second horizontal parameter comprises $b_2$, the second vertical parameter comprises $c_2$, $x_i$ comprises a row index, $y_j$ comprises a column index, $MV\_x_i$ comprises a horizontal motion vector component, and $MV\_y_j$ comprises a vertical motion vector component, wherein determining the first set of horizontal parameter candidates and determining the second set of horizontal parameter candidates comprises calculating, for each vector i, a value for $B_i$, where $B_i$ comprises a matrix $$\begin{bmatrix} b_{2_{vector-i}} \\ b_{1_{vector-i}} \end{bmatrix},$$

wherein the first set of horizontal parameter candidates comprises $b_{1\_vector-i}$ for each vector i, wherein the second set of horizontal parameter candidates comprises $b_{2\_vector-i}$ for each vector i, and wherein calculating the value of $B_i$ comprises calculating $(X^TX)^{-1}X^TMV_x$, wherein X comprises a matrix $$\begin{bmatrix} 1 & i \\ 2 & i \\ \ldots & \ldots \\ C & i \end{bmatrix},$$

wherein C corresponds to a number of vectors in the second subset of the plurality of vectors, wherein $X^T$ comprises a transpose matrix of X, and wherein $MV_x$ comprises a matrix $$\begin{bmatrix} 1*b_{2\_vector-i} + b_{1\_vector-i} \\ 2*b_{2\_vector-i} + b_{1\_vector-i} \\ \ldots \\ C*b_{2\_vector-i} + b_{1\_vector-i} \end{bmatrix},$$

and wherein determining the first set of vertical parameter candidates and determining the second set of vertical parameter candidates comprises calculating, for each vector j, a value for $C_j$, where $C_j$ comprises a matrix $$\begin{bmatrix} c_{2_{vector-j}} \\ c_{1_{vector-j}} \end{bmatrix},$$

wherein the first set of vertical parameter candidates comprises $c_{1\_vector-j}$ for each vector j, wherein the second set of vertical parameter candidates comprises $c_{2\_vector-j}$ for each vector j, and wherein calculating the value of $C_j$ comprises calculating $(Y^TY)^{-1}Y^T MV_y$, wherein Y comprises a matrix $$\begin{bmatrix} 1 & i \\ 2 & i \\ \ldots & \ldots \\ R & i \end{bmatrix},$$

wherein R corresponds to a number of vectors in the first subset of the plurality of vectors, wherein $Y^T$ comprises a transpose matrix of Y, and wherein $MV_y$ comprises a matrix $$\begin{bmatrix} 1*c_{2\_vector-j} + c_{1\_vector-j} \\ 2*c_{2\_vector-j} + c_{1\_vector-j} \\ \ldots \\ R*c_{2\_vector-j} + c_{1\_vector-j} \end{bmatrix}.$$

26. The computer-readable storage medium of claim 25, wherein the first subset of the plurality of vectors and the second subset of the plurality of vectors comprise the same subset.

27. The computer-readable storage medium of claim 25, wherein the plurality of coded units are arranged in rows and columns, wherein the first subset of the plurality of vectors corresponds to a subset of the rows, and wherein the second subset of the plurality of vectors corresponds to a subset of the columns.

28. The computer-readable storage medium of claim 25, further comprising instructions to calculate a value for $(X^TX)^{-1}$ prior to determining the first set of horizontal parameter candidates and to determining the second set of horizontal parameter candidates, and instructions to calculate a value for $(Y^TY)^{-1}$ prior to determining the first set of vertical parameter candidates and determining the second set of vertical parameter candidates.

29. The computer-readable storage medium of claim 25, further comprising instructions to:
remove, prior to calculating $B_i$, elements for which a block variance value of a corresponding block in vector i exceeds a threshold from the matrix X, the matrix $X^T$, and the matrix $MV_x$, for each vector i; and
remove, prior to calculating $C_j$, elements for which a block variance value of a corresponding block in vector j exceeds a threshold from the matrix Y, the matrix $Y^T$, and the matrix $MV_y$, for each vector j.

30. The computer-readable storage medium of claim 25, further comprising instructions to:
calculating error values for each of the horizontal parameter candidates of the first set and the second set of horizontal parameter candidates;
removing each of the horizontal parameter candidates from the first set and the second set of horizontal parameter candidates for which the calculated error value is below a first threshold prior to selecting a median value from the first set and the second set of horizontal parameter candidates;
calculating error values for each of the vertical parameter candidates of the first set and the second set of vertical parameter candidates; and
removing each of the vertical parameter candidates from the first set and the second set of vertical parameter candidates for which the calculated error value is below a second threshold prior to selecting a median value from the first set and the second set of vertical parameter candidates.

31. The computer-readable storage medium of claim 25, further comprising instructions to generate a frame rate upconversion (FRUC) frame using a global motion vector calculated according to the horizontal parameters and the vertical parameters of the global motion model.

32. The computer-readable storage medium of claim 25, further comprising instructions to correct one or more camera jitter artifacts by using a global motion vector calculated according to the horizontal parameters and the vertical parameters of the global motion model.

* * * * *